(12) United States Patent
Rostedt

(10) Patent No.: US 8,099,546 B2
(45) Date of Patent: Jan. 17, 2012

(54) MECHANISM FOR A LOCKLESS RING BUFFER IN OVERWRITE MODE

(75) Inventor: Steven D. Rostedt, Endwell, NY (US)

(73) Assignee: Red Hat, Inc., Raleigh, NC (US)

( * ) Notice: Subject to any disclaimer, the term of this patent is extended or adjusted under 35 U.S.C. 154(b) by 391 days.

(21) Appl. No.: 12/481,397

(22) Filed: Jun. 9, 2009

(65) Prior Publication Data

US 2010/0312985 A1  Dec. 9, 2010

(51) Int. Cl.
*G06F 12/00* (2006.01)
(52) U.S. Cl. .......... 711/110
(58) Field of Classification Search .......... None
See application file for complete search history.

(56) References Cited

U.S. PATENT DOCUMENTS

| 7,620,753 B1 * | 11/2009 | Beaman et al. | 710/56 |
| 2009/0073981 A1 * | 3/2009 | Coyte et al. | 370/392 |
| 2009/0204755 A1 * | 8/2009 | Rushworth et al. | 711/110 |
| 2010/0312975 A1 * | 12/2010 | Rostedt | 711/155 |
| 2010/0312985 A1 * | 12/2010 | Rostedt | 711/206 |
| 2010/0332755 A1 * | 12/2010 | Bu et al. | 711/119 |

OTHER PUBLICATIONS

Rostedt, S., The World of Ftrace, http://people.redhat.com/srostedt/ftrace-world.odp, Apr. 9, 2009, 33 pgs.

* cited by examiner

*Primary Examiner* — Hiep Nguyen
(74) *Attorney, Agent, or Firm* — Lowenstein Sandler PC

(57) ABSTRACT

In one embodiment, a mechanism for a lockless ring buffer in overwrite mode is disclosed. In one embodiment, a method for implementing a lockless ring buffer in overwrite mode includes aligning memory addresses for each page of a ring buffer to form maskable bits in the address to be used as a state flag for the page and utilizing at least a two least significant bits of each of the addresses to represent the state flag associated with the page represented by the address, wherein the state flag indicates one of three states including a header state, an update state, and a normal state. The method further includes combining a movement of a head page pointer to a head page of the ring buffer with a swapping of the head page and a reader page, the combining comprising updating the state flag of the head page pointer to the normal state and updating the state flag of a pointer to the page after the head page to the header state, and moving the head page and a tail page of the ring buffer, the moving comprising updating the state flags of one or more pointers in the ring buffer associated with the head page and the tail page.

20 Claims, 18 Drawing Sheets

BUFFER PAGE - 400

BUFFER PAGE - 400

BUFFER PAGE - 400

1000

```
┌─────────────────────────────────────────────┐
│ ALIGNING AN ADDRESS FOR EACH PAGE OF A RING │
│ BUFFER IN MEMORY TO FORM MASKABLE BITS TO BE│
│ USED AS A STATE FLAG FOR THE PAGE REPRESENTED│
│              BY THE ADDRESS                 │
│                   1010                      │
└─────────────────────────────────────────────┘
                      │
                      ▼
┌─────────────────────────────────────────────┐
│ UTILIZING AT LEAST THE TWO LEAST SIGNIFICANT BITS│
│ OF EACH ADDRESS FOR EACH PAGE OF THE RING   │
│ BUFFER AS THE STATE FLAG ASSOCIATED WITH THE│
│ POINTER, THE STATE FLAG INDICATING ONE OF THREE│
│ STATES INCLUDING A HEADER STATE, AN UPDATE STATE,│
│           AND A NORMAL STATE            │
│                   1020                      │
└─────────────────────────────────────────────┘
                      │
                      ▼
┌─────────────────────────────────────────────┐
│ COMBINING THE MOVEMENT OF A HEAD_PAGE POINTER│
│ IN THE RING BUFFER WITH A SWAPPING OF A RING BUFFER│
│ HEAD PAGE AND A READER PAGE BY UTILIZING THE STATE│
│ FLAGS INSIDE THE POINTERS OF THE RING BUFFER│
│                   1030                      │
└─────────────────────────────────────────────┘
                      │
                      ▼
┌─────────────────────────────────────────────┐
│ UTILIZING THE STATE FLAGS IN THE POINTERS OF THE RING│
│ BUFFER FOR MOVING HEAD AND TAIL PAGES OF THE RING│
│                   BUFFER                    │
│                   1040                      │
└─────────────────────────────────────────────┘
```

FIG. 10

MECHANISM FOR A LOCKLESS RING BUFFER IN OVERWRITE MODE

RELATED APPLICATION

The present application is related to co-filed U.S. patent application Ser. No. 12/481,376 entitled "Mechanism for a Reader Page for a Ring Buffer", which is assigned to the assignee of the present application.

TECHNICAL FIELD

The embodiments of the invention relate generally to ring buffers and, more specifically, relate to a mechanism for a lockless ring buffer in overwrite mode.

BACKGROUND

Tracing is a specialized use of logging to record information about a program's execution. This information is typically used by programmers for debugging purposes, and additionally, depending on the type and detail of information contained in a trace log, by experienced system administrators or technical support personnel to diagnose common problems with software. Often times, tracing utilities implemented ring buffers as the data structure to store the information obtained by the trace utility. Tasks that write into the ring buffer are known as producers or writers. Tasks that read from the ring buffer are known as consumers or readers.

With respect to a trace utility using a ring buffer for collecting data, the overhead of the writer must be as low as possible. The writer should be able to store data at any time and not worry about corruption of the buffer. A reader should be allowed to read the buffer at the same time that a writer is writing and it should not interfere with the writer.

A ring buffer with the above characteristics can easily be implemented with locks that serialize the writers and readers when a writer crosses a page boundary in the ring buffer, or when a reader swaps a page. However, locks have several disadvantages. They slow down the system. One task must wait for another task to release the lock before continuing. They may cause deadlocks if not careful. They also let the reader slow down the writer, if a reader is swapping out a page and a writer is about to cross a page boundary. Furthermore, if non-maskable interrupts (NMIs) are writing, writes may need to be dropped if the NMI fails to acquire a lock, because NMIs may never wait on a lock. There is no way to prevent an NMI. A NMI may preempt any writer that has the lock, and if the NMI were to wait on that lock it would be a deadlock.

The performance of writers, rather than readers, is more important with respect to ring buffers. The readers should be able to keep up with the collection of data, but the writers usually are writing out data from another application. The performance of the writer is also more critical because it affects the performance of the application. As such, a current goal for many tracing utilities utilizing ring buffers is to remove any locking from the writer's path. By doing so, the performance of the writer will increase.

An additional consideration with ring buffers is the mode in which they are operating. A ring buffer can operate in either overwrite mode or producer/consumer mode. Producer/consumer mode means that if the producer was to fill up the ring buffer before the consumer could free up anything, then the producer stops writing any new data to the buffer. This means that the most recent events are lost. Overwrite mode means if the produce was to fill up the buffer before the consumer could free up anything, then the producer overwrites the older data. This means that the oldest events are lost.

It is quite easy, and almost immaterial, to create a lockless design for ring buffers in producer/consumer mode because the reader and the writer are never on the same page in this mode. The writer will always stop when it reaches the reader. On the other hand, the difficulties with creating a lockless design for ring buffers in overwrite mode are substantial and daunting. As such, no solutions have been presented for such a situation. Therefore, a mechanism for a lockless ring buffer operating in overwrite mode would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 10 is a flow diagram illustrating a method to implement a lockless ring buffer according to an embodiment of the invention.

DETAILED DESCRIPTION

Figure 1:
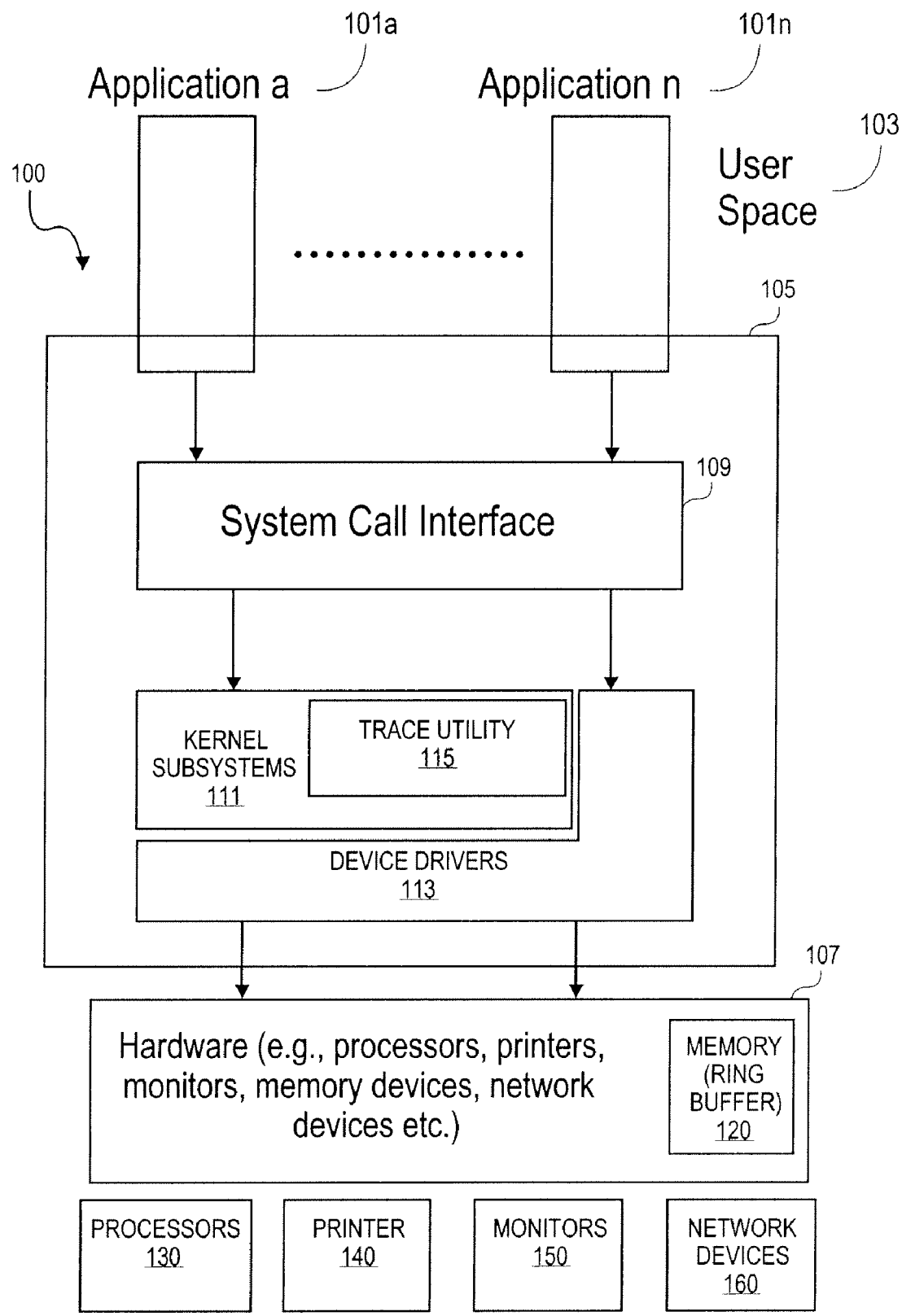
FIG. 1 is a block diagram of a system for implementing a lockless ring buffer operating in overwrite mode according to an embodiment of the invention.

Embodiments of the invention provide for a mechanism for a lockless ring buffer in overwrite mode. In one embodiment, a method for implementing a lockless ring buffer in overwrite mode includes aligning memory addresses for each page of a ring buffer to form maskable bits in the address to be used as a state flag for the page and utilizing at least a two least significant bits of each of the addresses to represent the state flag associated with the page represented by the address, wherein the state flag indicates one of three states including a header state, an update state, and a normal state. The method further includes combining a movement of a head page pointer to a head page of the ring buffer with a swapping of the head page and a reader page, the combining comprising updating the state flag of the head page pointer to the normal state and updating the state flag of a pointer to the page after the head page to the header state, and moving the head page and a tail page of the ring buffer, the moving comprising updating the state flags of one or more pointers in the ring buffer associated with the head page and the tail page.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram of a system 100 for implementing a lockless ring buffer operating in overwrite mode according to an embodiment of the invention. In particular, FIG. 1 shows the relationship between applications 101a-n, kernel 105, and hardware 107. Application programs 101a-n can include, for example, conventional word processing, graphic, and/or web browser programs, which directly interact with an end user. Application programs 101a-n are executed in a user space 103, and can be referred to as "processes," or "tasks" when program instructions are executed by the central processing unit (CPU) or multiple CPUs (not shown).

Kernel 105 includes system call interface 109, kernel subsystems 111, and device drivers 113. Application programs 101a-n communicate with kernel by making a conventional system call. System call interface 109 can receive requests from processes to access hardware 107 such as processors 130, printers 140, monitors 150, memory devices 120, and/or network devices 160, to name a few examples. Kernel 105 can execute these requests via kernel subsystems 111 and device drivers 113 in a conventional manner. Kernel subsystems 111 can also include interrupt handlers to service interrupt requests, a memory management system to manage address spaces, and system services such as networking and interprocess communications (IPC).

In one embodiment, kernel subsystems 111 include a trace utility 115. Trace utility 115 operates to examine the flow of execution (between processes, kernel threads, and interrupts) in system 100. Trace utility 115 is useful for analyzing where delays occur in the system 100, and to see how processes interact (especially with regard to scheduling, interrupts, synchronization primitives, etc.) Trace utility 115 records all of the data it tracks into memory 120.

In one embodiment, memory 120 is implemented as a lockless ring buffer operating in overwrite mode. In some embodiments trace utility 115 writes data it collects to a plurality of ring buffers each located on an individual processor of a multi-processor system.

In one embodiment, a ring buffer is an area of storage that acts as a circular storage area with a head and a tail. If the tail meets the head, then the buffer is considered full. Writes to the buffer are done at the "tail" and reads are done at the "head". It is called a ring buffer because the actual storage may be in an array. But the beginning and end of the array are not what defines the beginning and end of the buffer. If a write is at the end of the array, it will simply start writing at the beginning of the array, thus making a "ring".

The ring buffer of embodiments of the invention is made up of a list of pages held together by a link list. Each block of storage used by the ring buffer is called a page. Each page includes a prev pointer to the page before the present page in the ring buffer, and a next pointer to the page after the present page in the ring buffer. In this way, the pages of the ring buffer form a double linked list that can be traversed via the prev and next pointers.

In addition, the ring buffer of embodiments of the invention also utilized pointers to identify a reader page, a head page, a tail page, and a commit page, as well as locations within the tail and commit pages, in the ring buffer. The ring buffer of embodiments of the invention uses a head, commit, read, and tail page pointer, as well as a commit and tail index pointer. The reader_page pointer identifies a page outside of the ring buffer used solely (for the most part) by the reader. The head_page pointer identifies a page in the ring buffer that the reader will use next. The tail_page pointer identifies a page in the ring buffer that will be written to next by the writer. The tail_page_index pointer points to a place within the tail page where the last write request occurred. The commit_page pointer identifies a page in the ring buffer with the last finished non-nested write. The commit_page_index points to the place within the commit page where the last finished non-nested write has been finished and committed. If the tail or commit index pointers cross over to a next page, then the tail and page pointers will also be updated to the next page as well.

Ring buffers have both writers and readers that operate on the ring buffer. A writer is a task that writes into the ring buffer. As writer may also be known as a producer. A reader is a task that reads from the buffer. A reader may also be known as a consumer.

The writers and readers of the lockless ring buffer of embodiments of the invention follow certain guidelines.

The following describes guidelines applying to writers of the lockless ring buffer: A writer may only write to the ring buffer of the processor it is on. Writers may preempt another writer via an interrupt. However, a writer that preempts another writer must first finish (not be scheduled out) before the previous writer may continue. This is similar to a writer being preempted by an interrupt and the interrupt doing a write as well. As a result, the writers of the ring buffer act like a "stack". For example:

```
writer1 starts
    <interrupt>
    writer2 starts
        <interrupt>
        writer3 starts
        writer3 finishes
        <return from interrupt>
    writer2 finishes
    <return from interrupt>
writer1 finishes
```

The following describes guidelines applying to readers of the lockless ring buffer: A reader is allowed to read at any time from any ring buffer from any processor. However, no two readers may run at the same time, nor can a reader preempt another reader. A task doing a read may be scheduled out, as long as there are locks preventing another reader from starting. A reader cannot preempt a writer (although a writer can preempt a reader), but it can read from the buffer at the same time from another processor. That is, the reader cannot prevent a writer from finishing.

Figure 2A:
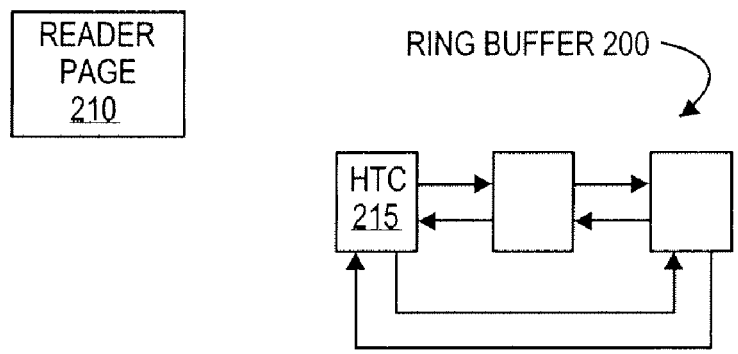
FIGS. 2A through 2D are block diagrams of a ring buffer utilizing a reader page according to an embodiment of the invention.
Figure 2B:
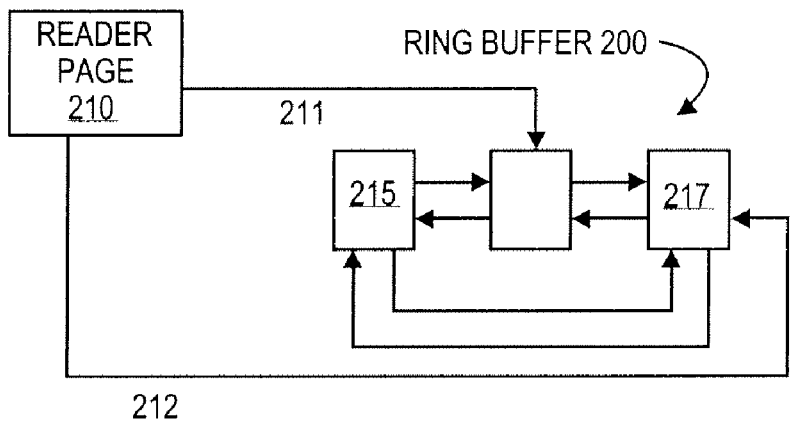
Figure 2C:
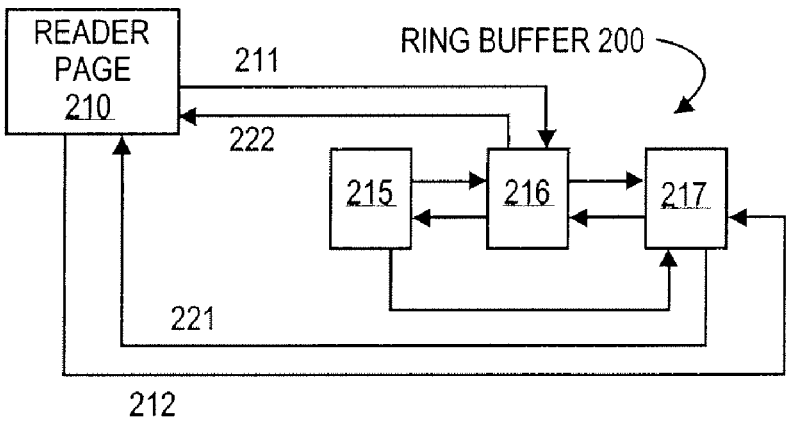

In one embodiment, at initialization of the lockless ring buffer of embodiments of the invention, a reader page is allocated for the reader that is not part of the ring buffer. FIGS. 2A through 2C are block diagrams of a ring buffer 200 utilizing a reader page according to an embodiment of the invention.

FIG. 2A is a block diagram illustrating such a ring buffer 200 with an associated reader page 210. The head_page, tail_page and commit_page pointers are all initialized to point to the same page 215. The reader has its own page 210 to use. At start up time, this page 210 is allocated but is not attached to the ring buffer 200. FIG. 2B illustrates how the reader page 210 is initialized to have its next pointer 211 pointing to the head page 215, and its previous pointer 212 pointing to the page 217 before the head page 215.

When the reader wants to read from the buffer, it performs a page swap with the head page 215 of the ring buffer 200. FIG. 2C illustrates such a page swap. The old reader page 210 becomes part of the ring buffer 200 and the head page 215 is removed from the ring buffer 200. A new next pointer 221 and previous pointer 222 point to the old reader page 210 in order to make this page 210 part of the ring buffer 200. Page 216 is now the new head page. Note that the previous reader page 210 that was swapped into the ring buffer 200 does not become a head page.

Figure 2D:
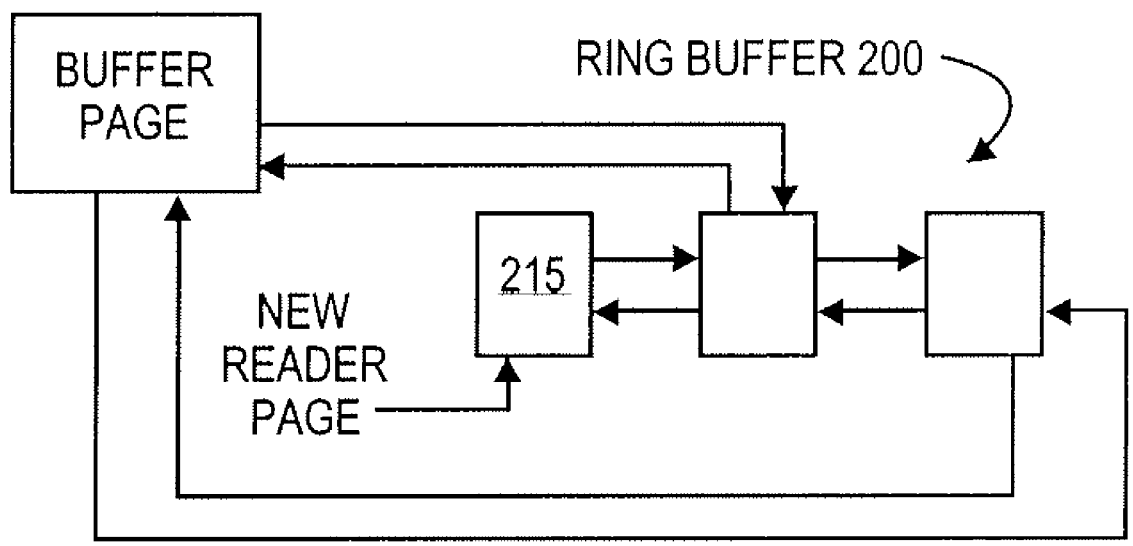

The final status of the ring buffer 200 and its associated reader page after the page swap is shown in FIG. 2D. Once page 215 is given via the swap to the reader, it becomes the new reader page 215 and the reader may do what it wants with this page as long as a writer is still not on the page.

In some embodiments, it is possible that the page swapped into the reader page is the commit page and the tail page. This situation occurs if the entire amount of data stored in the ring buffer is less than what is held in a buffer page. This situation is allowed by embodiments of the invention. When the writer leaves the reader page, it simply goes into the ring buffer because the reader page always points to the next location in the ring buffer.

Figure 3A:
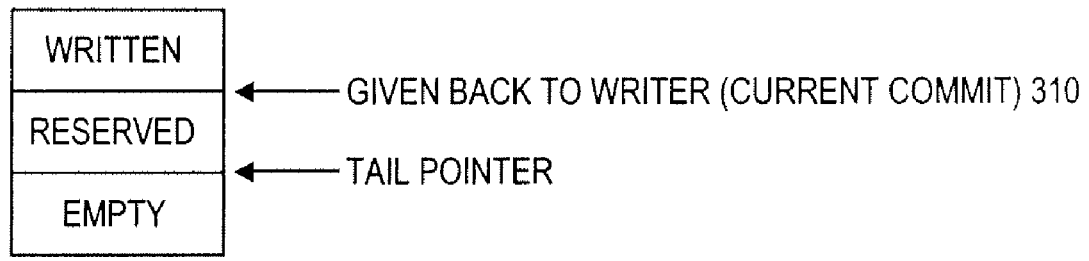
FIGS. 3A and 3B are block diagrams of illustrating the function of the commit page pointer for a ring buffer according to an embodiment of the invention.
Figure 3B:

FIGS. 3A and 3B are block diagrams illustrating the function of the commit_page pointer for a ring buffer 300 according to an embodiment of the invention. FIG. 3A illustrates a page 300 of a ring buffer having data written to it. As shown, a position, known as a current commit 310, is reserved in the ring buffer and passed back to the writer as a pointer. FIG. 3B illustrates the same page 300 of the ring buffer when the writer is finished writing the data of FIG. 3A. As shown, when the writer finishes writing the data into the reserved position, it commits the write by moving the current commit 310 to the end of the data just written.

Figure 4A:
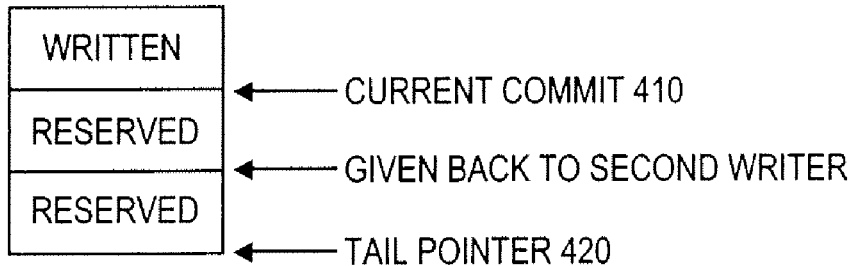
FIGS. 4A through 4C are block diagrams illustrating multiple writers to a page of a ring buffer according to an embodiment of the invention.
Figure 4B:
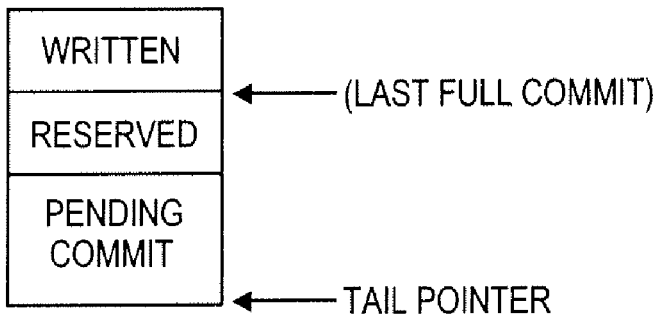
Figure 4C:
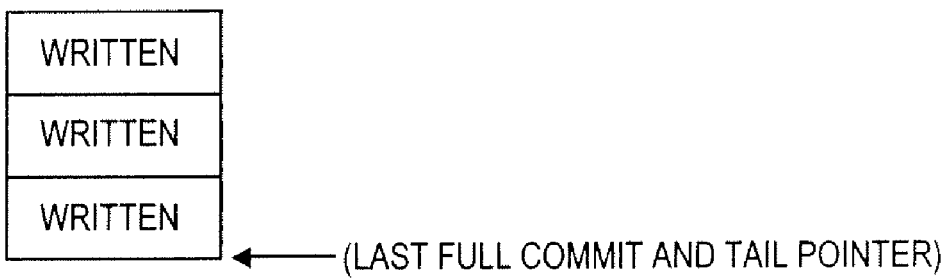

FIGS. 4A through 4C are block diagrams illustrating multiple writers to a page 400 of a ring buffer according to an embodiment of the invention. As previously discussed, while a writer is writing to a page of a ring buffer, another write (or a read) may take place at anytime during this transaction. If another write occurs, this newer write must finish before the previous preempted write may continue. In this case, the commit page may only be updated by the outermost (initial) writer in the writer stack. A writer that preempts another writer may not move the commit page.

FIG. 4A illustrates a ring buffer page 400 where a second write occurs after a first reserve by a first writer. As shown, the commit page index pointer 410 points to the last write location in the commit page that was committed without preempting another write, or in other words, the location with the last full commit. The tail page index pointer 420 points to the location in the tail page with the last write (before committing). The tail page index pointer 420 is always equal to or after the commit page index pointer 410. Logically, the same concept applies to the tail and commit pages themselves. In some cases, the tail page index pointer 420 may be several pages ahead of the commit page index pointer 410. In one embodiment, if the tail page index pointer 420 catches up to the commit page index pointer 410, then no more writes may take place (regardless of the mode of the ring buffer: overwrite and produce/consumer).

FIG. 4B illustrates the ring buffer page 400 after a second writer commits. When the second write that preempted the first write is committed, it becomes a pending commit and will not be a full commit until all writes (i.e., the first write) have been committed. FIG. 4C illustrates the ring buffer page 400 when the first writer commits. This shows the final status of the ring buffer page 400 once all writers have finished and committed.

In one embodiment, there is a special case when the head page is after the commit page and possibly after the tail page. This occurs when the commit (and tail) page has been swapped with the reader page. This is because the head page is always part of the ring buffer, but the reader page is not. Whenever there has been less than a full page that has been committed inside the ring buffer, and a reader swaps out a page, it will be swapping out the commit page. In this case, the head page will not move when the tail and commit move back into the ring buffer.

The reader cannot swap a page into the ring buffer if the commit page index pointer is still on the page. If the read meets the last commit (real commit, not pending or reserved), then there is nothing more to read. The buffer is considered empty until another full commit finishes.

A ring buffer utilizing the reader page described above has a few key differences between its operation in producer/consumer mode and its operation in overwrite mode. For instance, if the buffer is in overwrite mode, when the tail meets the head page, the head page will be pushed ahead one page. In contrast, if the buffer is in producer/consumer mode, the write will fail. Note that in this case the reader page will still point to the previous head page. However, when a swap takes place, it will use the most recent head page.

Embodiments of the invention provide for a lockless ring buffer that can be operated in overwrite mode. However, it is also possible for embodiments of the invention to be utilized for ring buffers operating in producer/consumer mode. In some embodiments, the lockless ring buffer is utilized by a trace utility, such as trace utility 115 described with respect to FIG. 1. However, embodiments of the invention are not limited to such an implementation. In addition, the current design of the lockless ring buffer of embodiments of the invention is ideal for multi-processor systems where a lockless ring buffer may be allocated on each processor.

Embodiments of the invention provide a lockless ring buffer by combining the movement of a head_page pointer with a swapping of a ring buffer head page and a reader page by utilizing state flags inside the pointers of the ring buffer. To enable this, each page of the ring buffer is aligned in memory to form maskable bits in each address to be used as state flags for the page represented by the address. In one embodiment, the addresses are aligned in memory by 4 bytes. Other embodiments may align the addresses in memory by different amounts. The alignment of addresses in memory in embodiments of the invention allows for at least the 2 least significant bits of the address to be used as flags, as they are always zero for the address. To get the address from the pointer, simply mask out the flags.

In embodiments of the invention, three state flags are kept by these two least significant bits: (1) HEADER—the page being pointed to is a head page; (2) UPDATE—the page being pointed to is being updated by a writer and was or is about to be a head page; and (3) NORMAL—the page being pointed to is neither in a HEADER state nor an UPDATE state. Note that only one of the state flags can be set on a pointer at a given time.

Figure 5A:
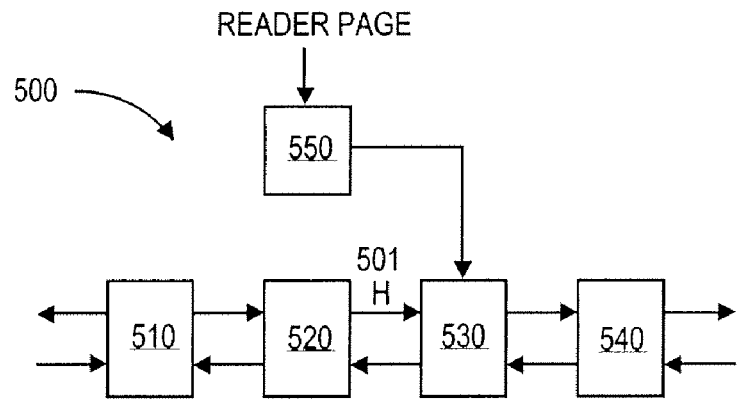
FIGS. 5A through 5C are block diagrams of a lockless ring buffer utilizing state flags according to an embodiment of the invention.
Figure 5B:
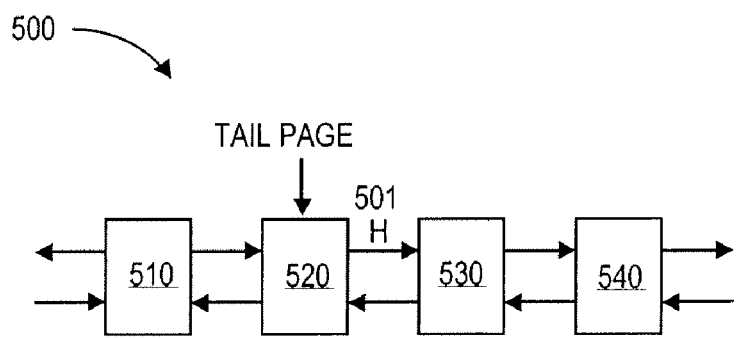
Figure 5C:
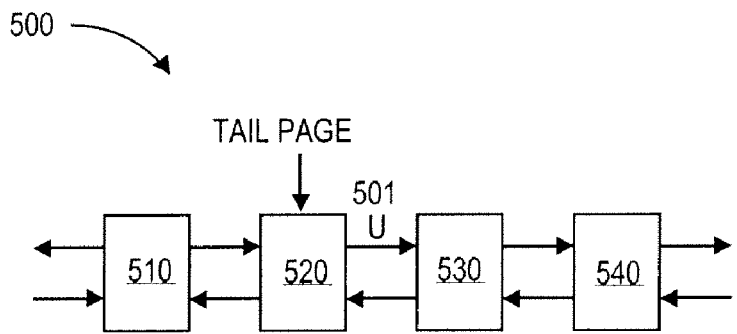

FIGS. 5A through 5C are block diagrams illustrating a lockless ring buffer 500 utilizing state flags according to an embodiment of the invention. As shown in FIG. 5A, lockless ring buffer 500 includes pages 510, 520, 530, and 540. A reader page 550 is also allocated for a reader of the ring buffer 500. The "-H->" above pointer 501 indicates that the HEADER flag is set in pointer 501. This indicates that the next_page 530 referred to by pointer 501 is the header page of the ring buffer 500, as well as the next page to be swapped out with the reader page 550 by the reader.

FIG. 5B illustrates the state of ring buffer 500 when the tail page 520 meets the head pointer 501, such as when a writer has caught up to the head page 530 in overwrite mode. As shown in FIG. 5C, a writer of the lockless ring buffer 500 uses a cmpxchg to change the pointer 501 from a HEADER state to an UPDATE state. Note that the "-U->" represents a pointer in the UPDATE state. In one embodiment, cmpxchg refers to a hardware-assisted atomic transaction that performs the following:

A=B iff previous A==C;

R=cmpxchg(A, C, B) is saying that we replace A with B if and only if current A is equal to C, and we put the old (current) A into R;

R gets the previous A regardless if A is updated with B or not;

To see if the update was successful, a compare of R==C may be used.

FIGS. 6A through 6E are block diagrams illustrating a reader page swap by a lockless ring buffer 600 according to an embodiment of the invention. In one embodiment, when a reader attempts to swap its reader page with the ring buffer for a read operation, the reader also uses a cmpxchg operation. If the state flag in the pointer to the head page does not have the HEADER flag set, the cmpxchg fails and the reader needs to look for the new head page and try again.

Figure 6A:
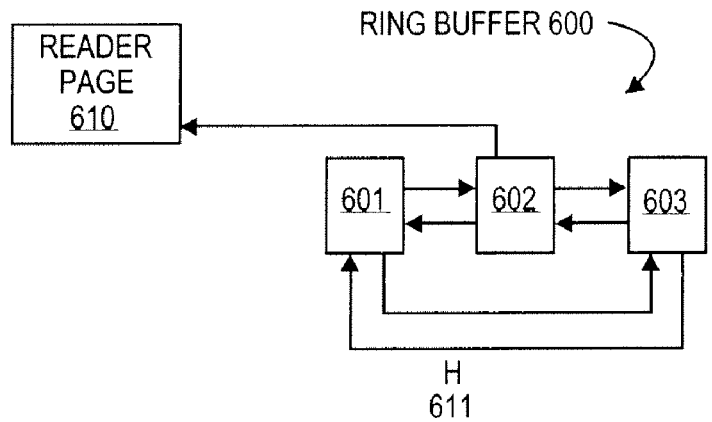
FIGS. 6A through 6E are block diagrams of a reader page swap by a lockless ring buffer according to an embodiment of the invention.
Figure 6B:
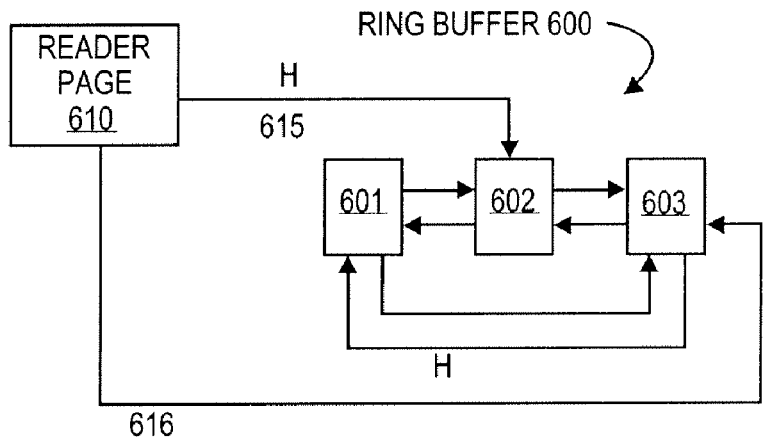

FIG. 6A illustrates the initial state of the lockless ring buffer 600 prior to the swap. Lockless ring buffer 600 includes pages 601, 602, and 603. Based on head pointer 611, page 601 is the head page of lockless ring buffer 600. As shown in FIG. 6B, the reader sets the next pointer 615 of the reader page 610 to point to page 602 (the page after head page 601) and sets the state flag of this pointer 615 as HEADER. It also sets the previous pointer 616 of the reader page 610 to point to page 603 (prior the head page 601).

Figure 6C:
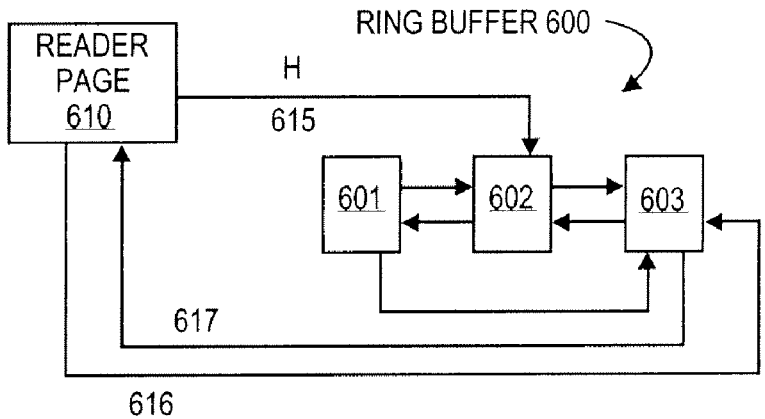
Figure 6D:
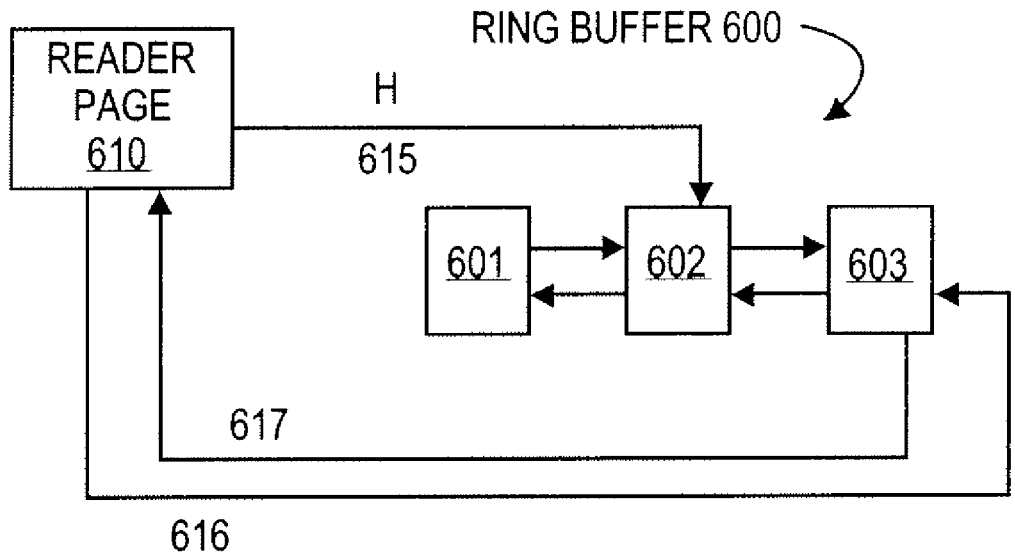

As this point, as illustrated in FIG. 6C, the reader does a cmpxchg with pointer 617 from page 603 (the page previous to the head page 601) to make it point to the reader page 610. Note that the new pointer 617 does not have the HEADER flag set. This action atomically moves the head page forward to page 602. In addition, at this point, the reader page 601 is no longer the reader page and page 601 is now the new reader page. FIG. 6D illustrates that after the new head page 602 and new reader page 601 are set, the initial previous pointer (not new previous pointer 617) from page 603 is removed as it now points to the new reader page.

Figure 6E:
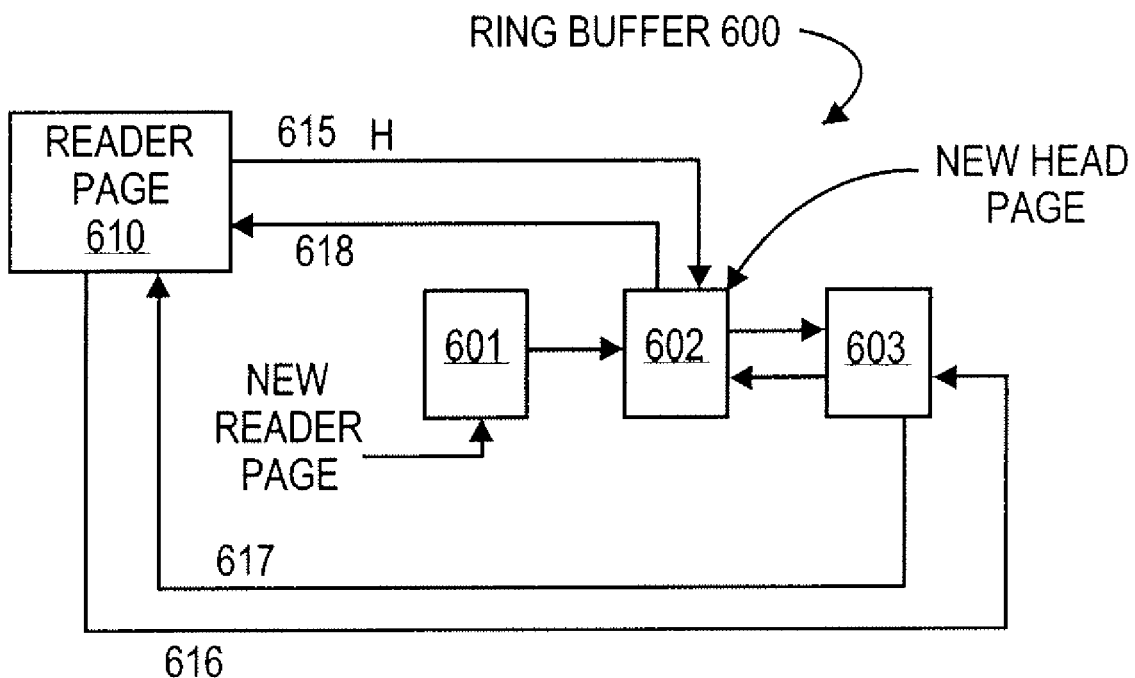

Lastly, FIG. 6E shows that after the new head page 602 is set, the previous pointer 618 from new head page 602 is updated to the reader page 610 to complete reader page 610's inclusion into the ring buffer 600. As such, this figures illustrates the final state of the lockless ring buffer 600 after the reader page swap. As shown, the old reader page 610 is now part of the ring buffer 600. Furthermore, the previous head page 601 is now the new reader page and page 602 is now the new head page. The new reader page 601 is also shown to point to the new header page 602 of the ring buffer 600.

It is important to note that, in embodiments of the invention, the page that the reader page points back to by its previous pointer (the one that now points to the new head page) never points back to the reader page. That is because the reader page is not part of the ring buffer. Traversing the ring buffer via the next pointers will always stay in the ring buffer. Traversing the ring buffer via the prev pointers may not. As such, the way to determine a reader page is simply by examining the previous pointer of the page. If the next pointer of the previous page does not point back to the original page, then the original page is a reader page. This is exemplified above in FIG. 6D.

FIGS. 7A through 7E are block diagrams illustrating a process of moving a head page and tail page in a lockless ring buffer 700 according to an embodiment of the invention. Such a situation requiring movement of the head page and tail page would occur when the tail page meets the head page because a writer has caught up to the head page of the ring buffer in overwrite mode.

Figure 7A:
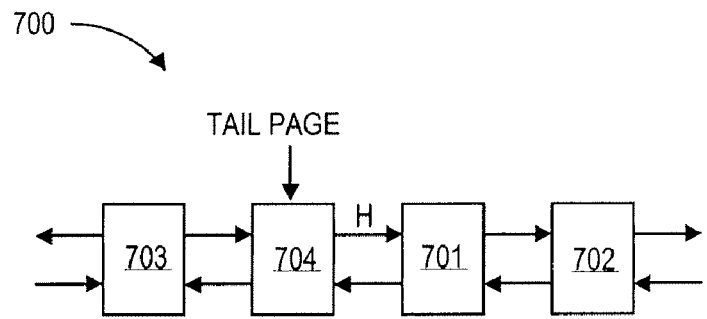
FIGS. 7A through 7E are block diagrams of moving a head page and tail page in a lockless ring buffer according to an embodiment of the invention.

As shown in FIG. 7A, when the tail page 704 meets the head page 701 of the lockless ring buffer 700 that is in overwrite mode and more writes take place to the buffer 700, then the head page 701 must be moved forward before the writer may move the tail page 704. This is to ensure that the newest data is always in the ring buffer 700, while the oldest data is written over.

Figure 7B:
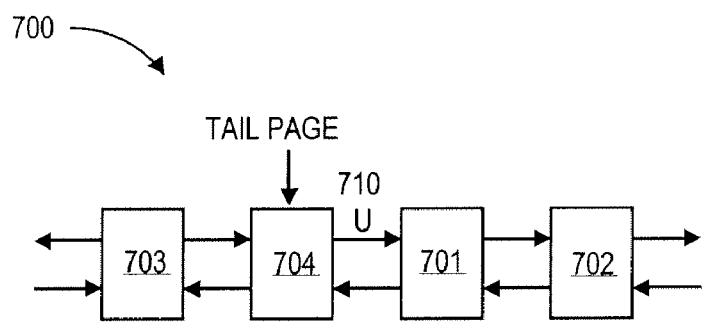

In one embodiment, moving the head and tail pages of the lockless ring buffer 700 is accomplished by the writer performing a cmpxchg to convert the state flag of the pointer 710 to the head page 701 from HEADER to UPDATE, as shown in FIG. 7B. Once this is done, a reader will not be able to swap the head page from the buffer 700, nor be able to move the head page 701 in the buffer 700, until the writer is finished with the move. This eliminates any races that the reader can have with the writer. The reader must spin, and this is why the reader cannot preempt the writer in the lockless ring buffer of embodiments of the invention.

Figure 7C:
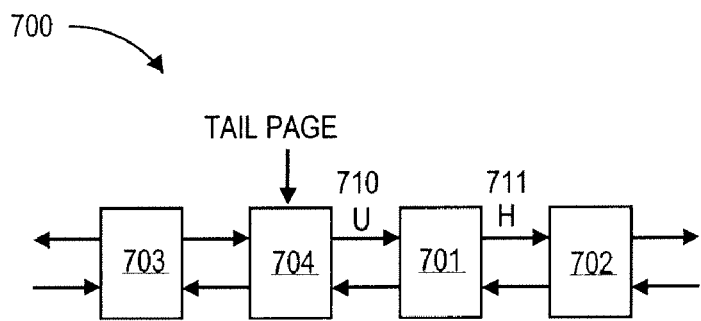
Figure 7D:
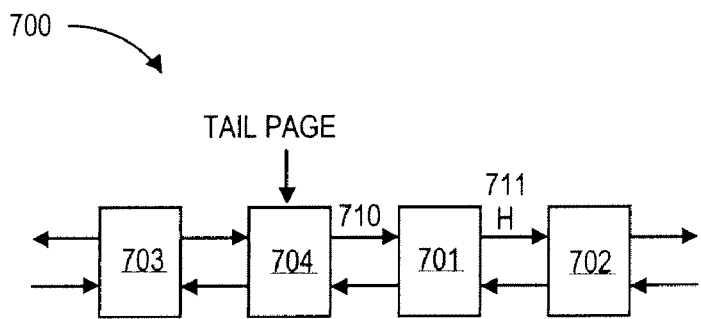
Figure 7E:
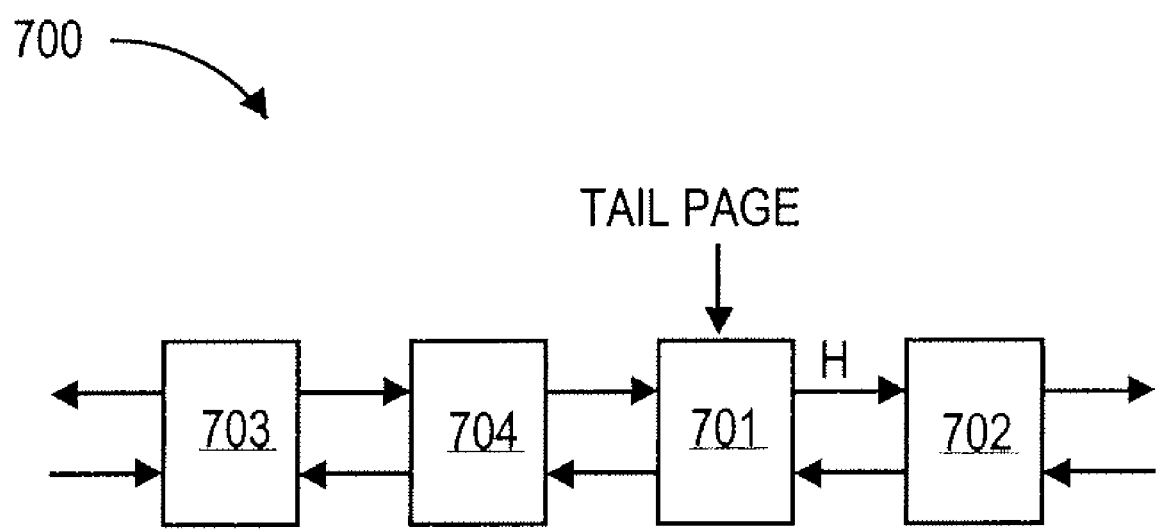

Then, as shown in FIG. 7C, page 702 is made into the new head page. After the new head page 702 has been set, the state flag of pointer 710 may be set back to NORMAL (from HEADER) as shown in FIG. 7D. After the head page has been moved to page 702, the tail page set at page 704 can move forward to page 701, as illustrated in FIG. 7E.

As previously stated, if enough writes preempt the first write, the tail page could possibly make its way around the lockless ring buffer and meet the commit page. If this occurs, writes are dropped in embodiments of the invention, usually with a warning to the end user of the lockless ring buffer. Furthermore, if the commit_page pointer is still on the reader page and not part of the ring buffer, the tail page should account for this. In this case, if the tail page were to simply push the head page forward, the commit_page pointer would not be pointing to the correct page when it is leaving the reader page. Embodiments of the invention provide a solution for this by having the reader or writer test if the commit_page pointer is on the reader page before pushing the head page. If it is, then it can be assumed that the tail page wrapped the buffer, and any new writes must be dropped.

The scenario described above is not a race condition because the commit_page pointer can only be moved by the outermost initial writer. This means that the commit will not move while a preempting writer is moving the tail page. The reader cannot swap the reader page if it is also being used as the commit page. Instead, the reader may simply check that the commit_page pointer is off the reader page. Once the commit page leaves the reader page it will never go back on it unless a reader does another swap with the buffer head page that is also the commit page.

As just discussed, in embodiments of the invention, in the pushing forward of the tail page, the head page must first be pushed forward if the head page is the next page. If the head page is not the next page, the tail page is simply updated with a cmpxchg. Only writers can move the tail page. This must be done atomically to protect against nested writers. The following pseudo-code for a writer updates the tail page if it is still pointing to the expected page:

temp_page=tail_page
    next_page=temp_page->next
    cmpxchg(tail_page, temp_page, next_page)

If the above fails, then a nested write pushed it forward and the current write does not need to push the head page.

Moving (i.e., updating) the head page while nested writes are occurring is a bit more complex than updating the tail page in embodiments of the invention. FIGS. 8A through 8E are block diagrams illustrating nested writes updating a head page of a lockless ring buffer 800 in overwrite mode according to an embodiment of the invention.

Figure 8A:
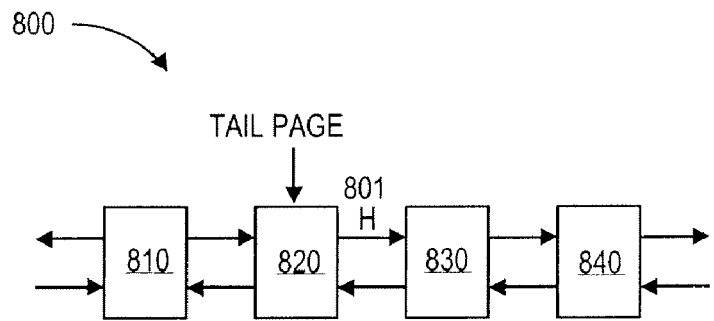
FIGS. 8A through 8E are block diagrams of nested writes updating a head page in a lockless ring buffer according to an embodiment of the invention.
Figure 8B:
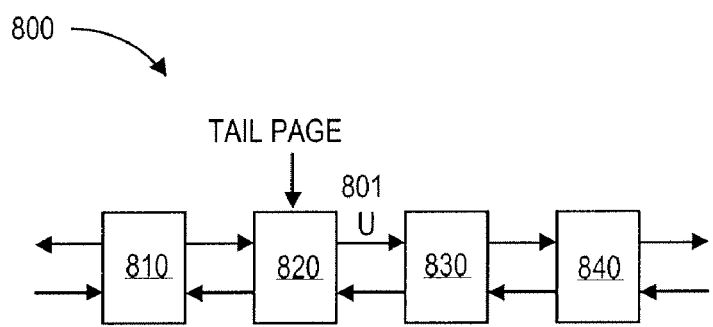

FIG. 8A illustrates the initial state of the lockless ring buffer 800 in overwrite mode. Buffer 800 includes pages 810, 820, 830, and 804. Initially, the tail page 820 runs into the head page 830. FIG. 8B illustrates where the write converts the head page pointer 801 of the lockless ring buffer 800 to UPDATE.

Figure 8C:
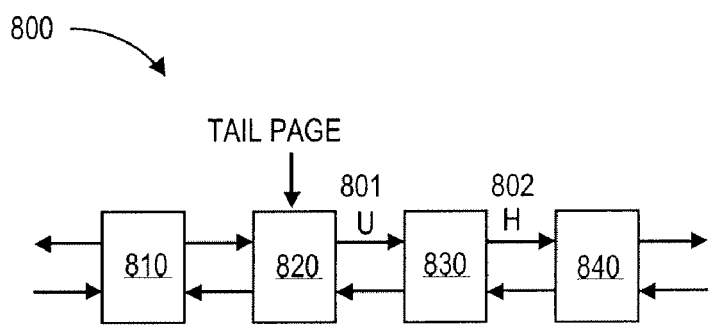
Figure 8D:
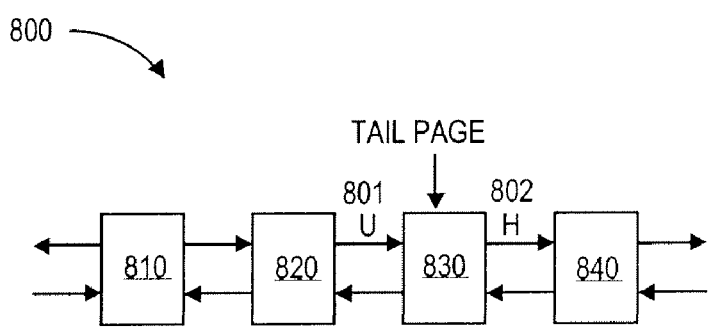
Figure 8E:
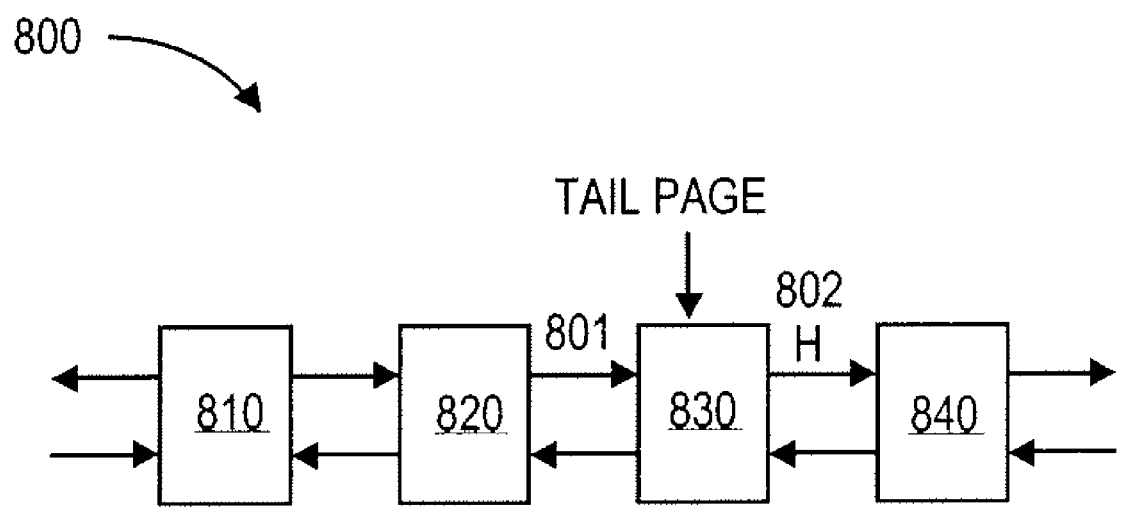

FIG. 8C illustrates what happens if a nested writer preempts at this point. The nested writer will see that the next page 830 is a head page. It will also detect that it (the writer itself) is nested and will save that information. The nested writer then sets the new head page pointer 802, but it will not reset the update pointer 801 back to NORMAL because the writer determined that it is a nested writer. Only the writer that converted a pointer from HEADER to UPDATE can convert it back to NORMAL. The nested writer then moves the tail page forward to page 830, as shown in FIG. 8D. After the nested writer finishes, the outermost initial writer converts the state flag of pointer 801 from UPDATE to NORMAL, as shown in FIG. 8E.

Figure 9A:
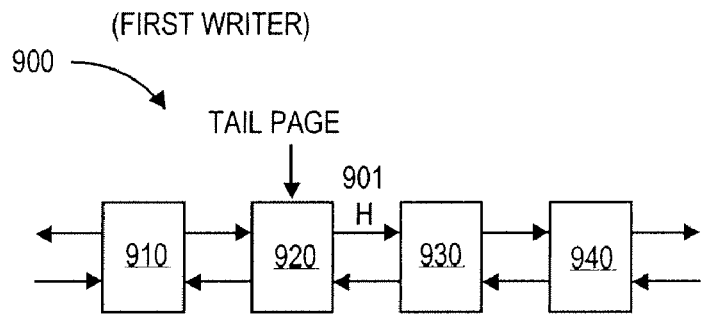
FIGS. 9A through 9M are block diagrams of a lockless ring buffer with nested writes moving both of a head and a tail page of the lockless ring buffer according to an embodiment of the invention.
Figure 9B:
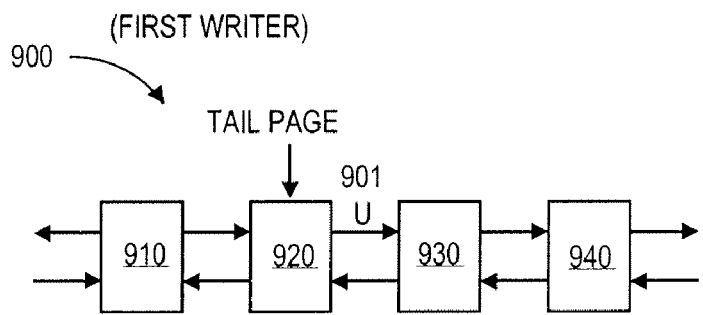

Embodiments of the invention may be even more complex if several nested writes occur and move the tail page ahead several pages. FIGS. 9A through 9M are block diagrams of a lockless ring buffer 900 with nested writes moving both of a head and a tail page of the lockless ring buffer 900 in overwrite mode according to an embodiment of the invention. FIG. 9A shows the initial state of lockless ring buffer 900 when a first writer causes a tail page 920 to meet a head page 930 in overwrite mode. As shown in FIG. 9B, the first writer converts the state flag of head page pointer 901 to UPDATE.

Figure 9C:
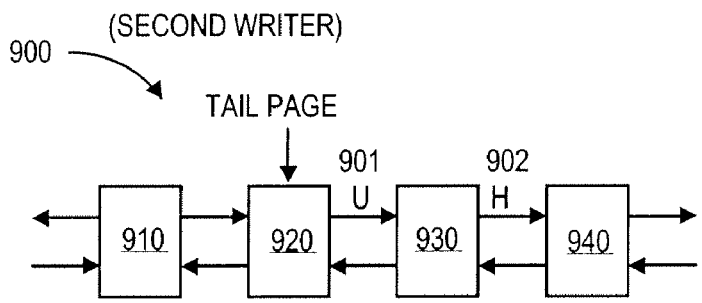
Figure 9D:
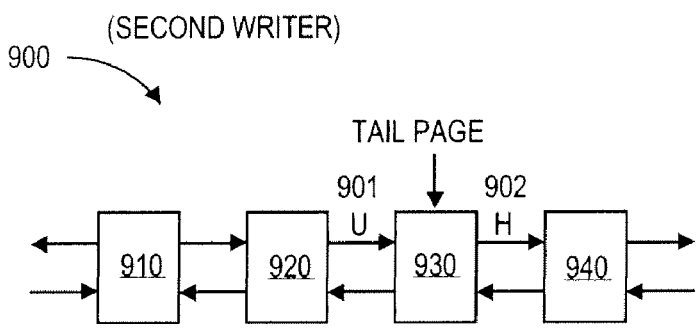

Subsequently, as illustrated in FIG. 9C, a second writer preempts and observes pointer 901 with UPDATE state. The second writer then sets up page 940 as the new head page by setting the next page pointer 902 from page 930 to HEADER. In FIG. 9D, the nested second writer moves the tail page forward to page 930 but does not set the state flag of pointer 901 back to NORMAL (from UPDATE) because it is not the outermost initial writer (e.g., the first writer).

Figure 9E:
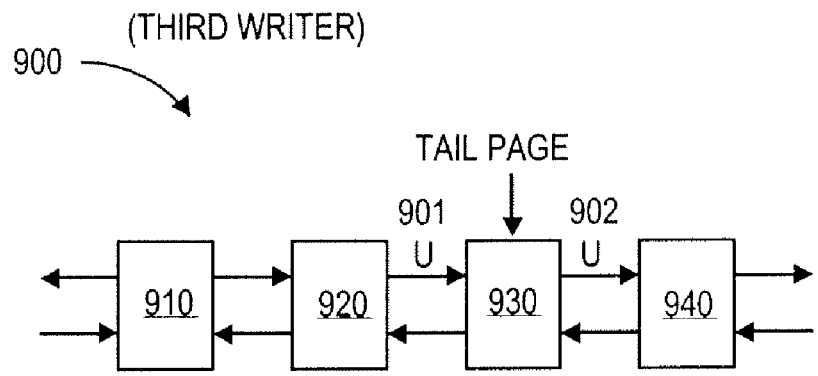
Figure 9F:
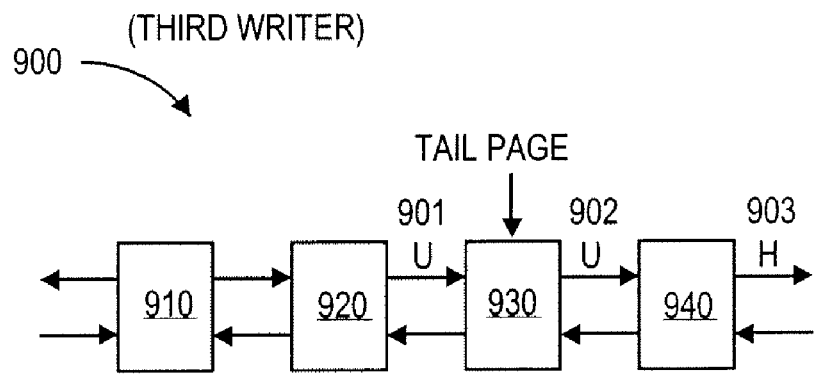
Figure 9G:
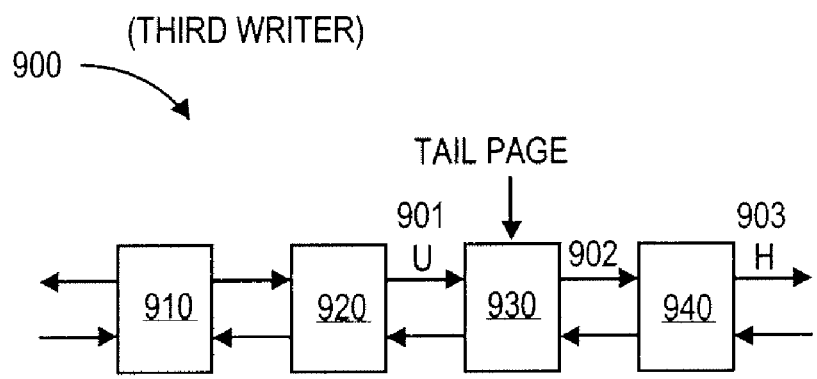

Then, as illustrated in FIG. 9E, a third writer preempts in the lockless ring buffer 900 and observes that page 940 after tail page 930 is a head page. As a result, the third writer changes the state flag of next pointer 902 from page 930 from HEADER to UPDATE. Subsequently, as shown in FIG. 9F, the third writer moves the head page forward to page 910 by setting the state flag of next page pointer 903 from page 940 to HEADER. Because the third writer was the writer that changed the state flag of pointer 902 from HEADER to UPDATE, it is thereby allowed to change that state flag of pointer 902 back to NORMAL, as shown in FIG. 9G. Then, as illustrated in FIG. 9H, the third writer moves the tail page to page 940, and control of the lockless ring buffer 900 returns back to the second writer.

Figure 9H:
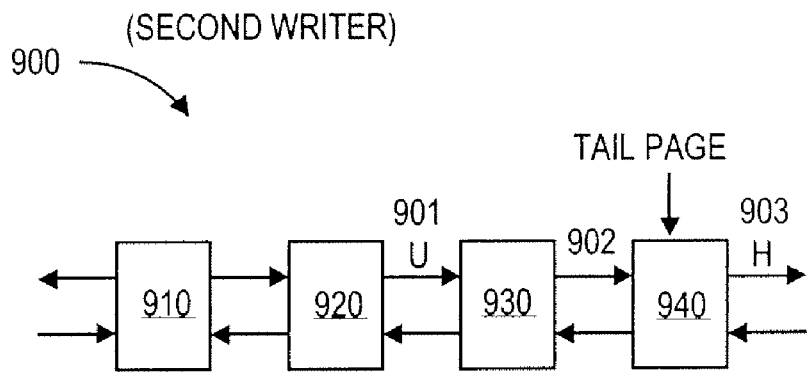
Figure 9I:
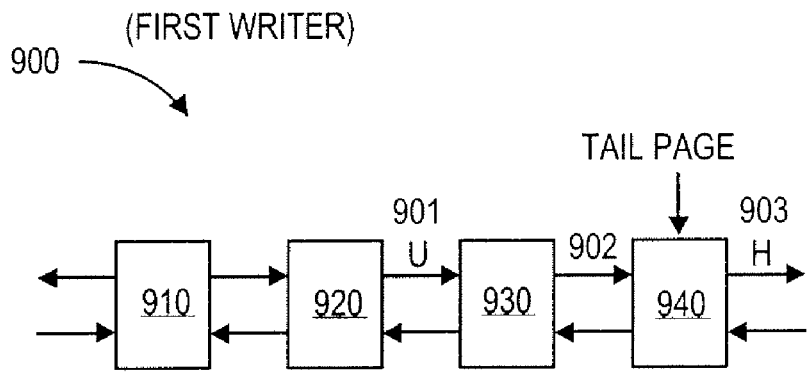

At this point, as illustrated in FIG. 9I, the second writer is unable to move the tail page because it was already moved by the third writer in FIG. 9H. As a result, the second writer proceeds to add its data to the new tail page 940. Then, control of the lockless ring buffer 900 returns to the first writer.

Figure 9J:
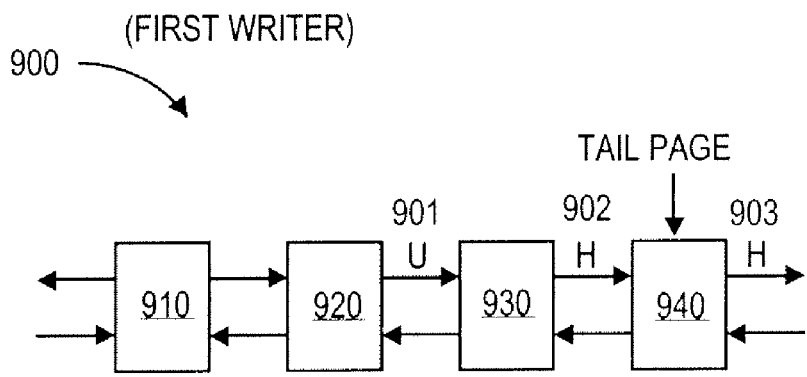

The first writer cannot know atomically that the tail page moved, so as a result it will update the head page to what it thinks is the new head page (i.e., page 940) by setting the state flag of next page pointer 902 from page 930 to HEADER, as shown in FIG. 9J. Because the cmpxchg returns the old value of the pointer 902, namely NORMAL from FIG. 9B, the first writer sees that it succeeded in updating the pointer 902 from NORMAL to HEADER. However, this is not good enough as it is clear that the real head page is now page 910.

Figure 9K:
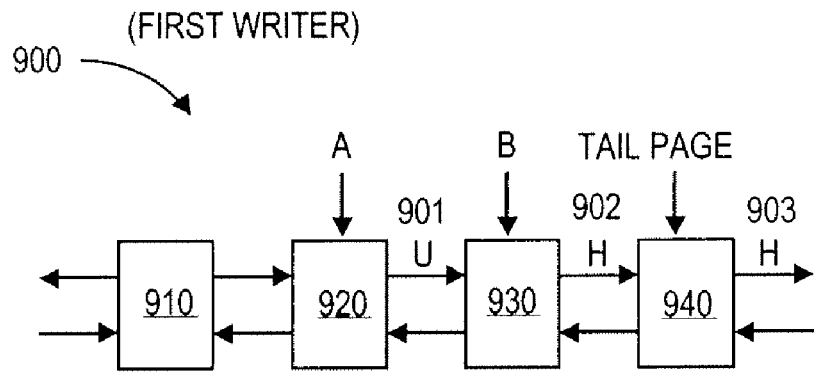
Figure 9L:
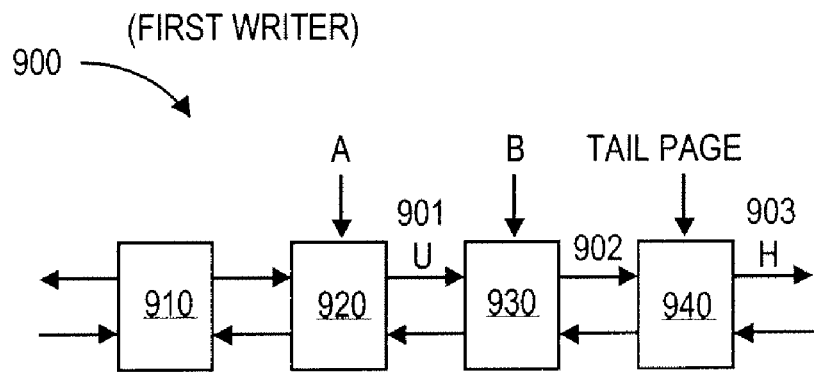

As a result, the first writer must also check to see if the current tail page (page 940) is either where it use to be or on the next page. FIG. 9K illustrates such a check. As shown, the first writer checks if the current tail page is equal to either of "A" (last known tail page to the present writer) or "B" (next page after last known tail page to the present writer). As the last known tail page to the first writer was page 920 (see FIG. 9B), then page 920 is "A" and page 930 is "B" for purposes of the above check. If not this check fails, then the first writer must reset the pointer back to NORMAL. In the present example, the current tail page (page 910) is neither of "A" (page 920) nor "B" (page 930). As a result, as illustrated in FIG. 9L, the first writer sets pointer 902 back to NORMAL from the HEADER status.

Figure 9M:
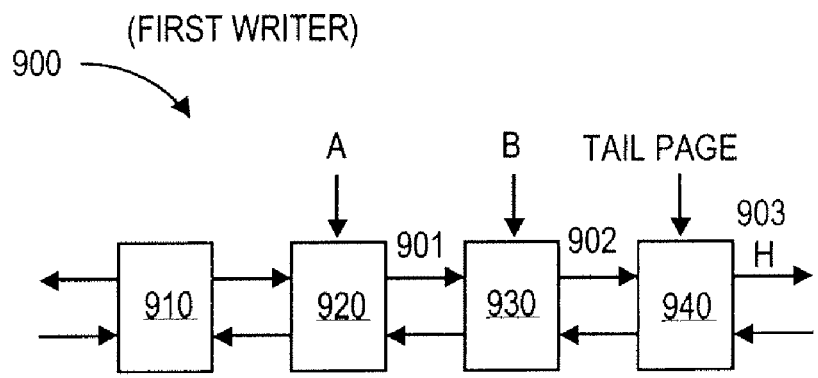

Finally, the first writer can update the head page, as shown in FIG. 9M. The first writer does this by changing the state flag of pointer 901 from UPDATE to NORMAL. As the present example has illustrated, this is why the head page must remain in the UPDATE status and only be reset by the writer that changed the state flag in the first place (the outermost initial writer). This prevents a reader of the ring buffer 900 from seeing an incorrect head page.

FIG. 10 is a flow diagram illustrating a method 1000 for implementing a lockless ring buffer in overwrite mode according to an embodiment of the invention. Method 1000 may be performed by processing logic that may comprise hardware (e.g., circuitry, dedicated logic, programmable logic, microcode, etc.), software (such as instructions run on a processing device), or a combination thereof. In one embodiment, method 1000 is performed by system 100, and more specifically tracing utility 115 and processors 130 of system 100, described with respect to FIG. 1.

Method 1000 begins at block 1010 where an address for each page of a ring buffer is aligned in memory to form maskable bits to be used as a state flag for the page represented by the address. In one embodiment, the addresses are aligned by 4 bytes in memory. Then, at block 1020, at least the two least significant bits of each address for each page of the ring buffer are utilized to represent a state flag for a pointer to the address in the ring buffer. In one embodiment, the state flag indicates one of three possible states including a HEADER state, an UPDATE state, and a NORMAL state. As discussed above, the HEADER flag indicates that the page being pointed to is a head page, the UPDATE flag indicates that the page being pointed to is being updated by a writer and was or is about to be a head page, and the NORMAL flag indicates that the page being pointed to is neither in a HEADER state nor an UPDATE state. Note that only one state may by represented by the state flags at a given time in embodiments of the invention.

Then, at block 1030, the combination of a movement of a head page pointer in the ring buffer with a swapping of a ring buffer head page and a reader page is enabled by the utilization of the state flags inside the pointers of the ring buffer. For instance, in one embodiment, FIGS. 6A through 6E illustrate the process of block 1030. Lastly, at block 1040, the state flags of the pointers of the ring buffer are utilized for moving head and tail pages of the ring buffer. FIGS. 7A through 7E, 8A through 8E, and 9A through 9M illustrate various situations for performing block 1040.

Figure 11:
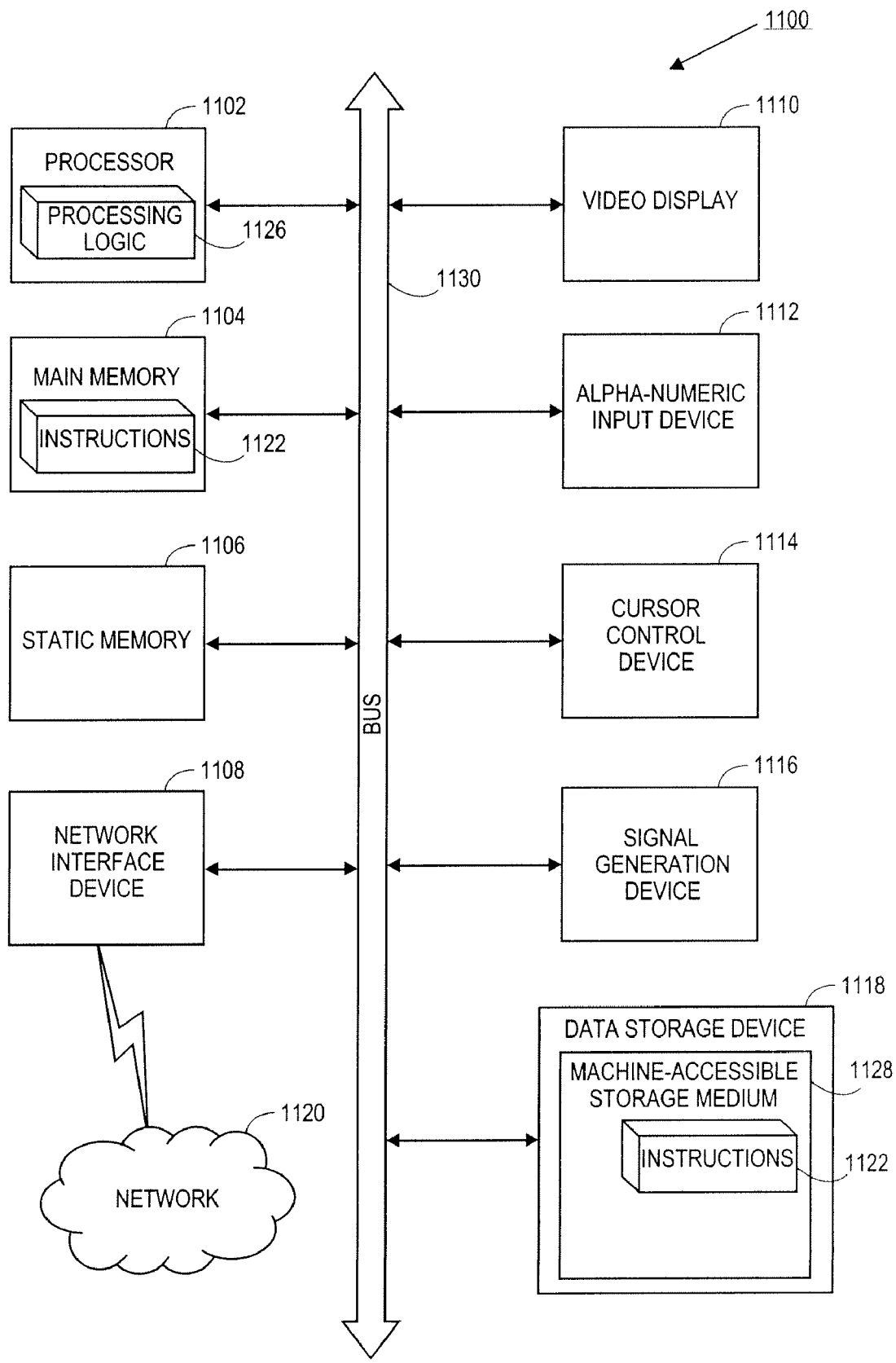
FIG. 11 illustrates a block diagram of one embodiment of a computer system.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device 1102, a main memory 1104 (e.g., read-only memory (ROM), flash memory, dynamic random access memory (DRAM) (such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute the processing logic 1126 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a machine-accessible storage medium 1128 on which is stored one or more set of instructions (e.g., software 1122) embodying any one or more of the methodologies of functions described herein. The software 1122 may also reside, completely or at least partially, within the main memory 1104 and/or within the processing device 1102 during execution thereof by the computer system 1100; the main memory 1104 and the processing device 1102 also constituting machine-accessible storage media. The software 1122 may further be transmitted or received over a network 1120 via the network interface device 1108.

The machine-readable storage medium 1128 may also be used to stored instructions to perform method 1000 to provide a lockless ring buffer as described with respect to FIG. 10, and/or a software library containing methods that call the above applications. While the machine-accessible storage medium 1128 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
   aligning memory addresses for each page of a ring buffer to form maskable bits in the address to be used as a state flag for the page, the ring buffer stored in a physical memory device;
   utilizing at least two least significant bits of each of the addresses to represent the state flag associated with the page represented by the address, wherein the state flag indicates one of three states including a header state, an update state, and a normal state;
   combining, by a processing device coupled to the physical memory device, a movement of a head page pointer to a head page of the ring buffer with a swapping of the head page and a reader page, the combining comprising updating the state flag of the head page pointer to the normal state and updating the state flag of a pointer to the page after the head page to the header state; and
   moving, by the processing device, the head page and a tail page of the ring buffer, the moving comprising updating the state flags of one or more pointers in the ring buffer associated with the head page and the tail page.

2. The method of claim 1, wherein the reader page is used solely by a reader of the ring buffer and is not part of the ring buffer.

3. The method of claim 2, wherein combining the movement of the head page pointer with the swap of the head page and the reader page further includes the reader performing a cmpxchg operation to force the head page pointer to point to the reader page.

4. The method of claim 1, wherein moving the head page and the tail page occurs when the ring buffer is in overwrite mode and a writer of the ring buffer catches up to the head page by moving the tail page forward with one or more writes to the ring buffer by the writer.

5. The method of claim 4, wherein moving the head page and the tail page further includes the writer:
   performing a cmpxchg operation to change the state flag of a pointer to the head page from the header state to the update state so that a reader of the ring buffer is not able to swap the head page from the ring buffer;
   changing the state flag of a next page pointer from the head page to the header state in order to make a next page following the head page a new head page;
   setting the state flag of the pointer to the previous head page from the update state to the normal state; and
   moving the tail page forward to the previous head page.

6. The method of claim 1, wherein a writer to the ring buffer preempts any other writers that are writing to the ring buffer via an interrupt and wherein the preempting writer must finish its write before any of the preempted writers can continue.

7. The method of claim 6, wherein only the writer that converted the state flag of a pointer from the header state to the update state can convert that pointer from the update state to the normal state.

8. The method of claim 1, wherein the ring buffer includes a pointer to a commit page that is a page in the ring buffer with a last finished non-nested write.

9. The method of claim 8, wherein a reader may swap a page out of the ring buffer that is at least one of the commit page and the tail page, but cannot swap the reader page into the ring buffer if it is the commit page.

10. A system, comprising:
    a storage device to store a ring buffer with memory addresses for each page of the ring buffer aligned to form maskable bits to be used as a state flag for the page represented by the address;
    one or more device drivers to control the storage device; and
    a kernel to communicably coupled to the one or more device drivers and the storage device, the kernel including a tracing utility to:
       utilize at least two least significant bits of each address for each page of the ring buffer to represent the state flag associated with the page represented by the address, wherein the state flag indicates one of three states including a header state, an update state, and a normal state;
       combine a movement of a head page pointer to a head page of the ring buffer with a swap of the head page and a reader page associated with the ring buffer, the combining comprising updating the state flag of the head page pointer to the normal state and updating the state flag of a pointer to the page after the head page to the header state; and
       move the head page and a tail page of the ring buffer, the moving comprising updating the state flags of one or more pointers in the ring buffer;
       wherein the reader page is used solely by a reader of the ring buffer and is not part of the ring buffer.

11. The system of claim 10, wherein combining the movement of the head page pointer with the swap of the head page and the reader page further includes the reader performing a cmpxchg operation to force the head page pointer to point to the reader page.

12. The system of claim 10, wherein moving the head page and the tail page occurs when the ring buffer is in overwrite mode and a writer of the ring buffer catches up to the head page by moving the tail page forward with one or more writes to the ring buffer by the writer.

13. The system of claim 12, wherein moving the head page and the tail page further includes the tracing utility to direct the writer to:
   performing a cmpxchg operation to change the state flag of a pointer to the head page from the header state to the update state so that a reader of the ring buffer is not able to swap the head page from the ring buffer;
   changing the state flag of a next page pointer from the head page to the header state in order to make the next page following the head page a new head page;
   setting the state flag of the pointer to the previous head page from the update state to the normal state; and
   moving the tail page forward to the previous head page.

14. The system of claim 10, wherein a writer to the ring buffer preempts any other writers that are writing to the ring buffer via an interrupt, wherein the preempting writer must finish its write before any of the preempted writers can continue, and wherein only the writer that converted the state flag of a pointer from the header state to the update state can convert that pointer from the update state to the normal state.

15. The system of claim 10, wherein the ring buffer includes a pointer to a commit page that is a page in the ring buffer with a last finished non-nested write, and wherein a reader may swap a page out of the ring buffer that is at least one of the commit page and the tail page, but cannot swap the reader page into the ring buffer if it is the commit page.

16. An article of manufacture comprising a machine-readable storage medium including data that, when accessed by a machine, cause the machine to perform operations comprising:
   aligning memory addresses for each page of a ring buffer to form maskable bits in the address to be used as a state flag for the page;
   utilizing at least two least significant bits of each of the addresses to represent the state flag associated with the page represented by the address, wherein the state flag indicates one of three states including a header state, an update state, and a normal state;
   combining a movement of a head page pointer to a head page of the ring buffer with a swapping of the head page and a reader page, the combining comprising updating the state flag of the head page pointer to the normal state and updating the state flag of a pointer to the page after the head page to the header state; and
   moving the head page and a tail page of the ring buffer, the moving comprising updating the state flags of one or more pointers in the ring buffer associated with the head page and the tail page;
   wherein the reader page is used solely by a reader of the ring buffer and is not part of the ring buffer.

17. The article of manufacture of claim 16, wherein combining the movement of the head page pointer with the swap of the head page and the reader page further includes the reader performing a cmpxchg operation to force the head page pointer to point to the reader page.

18. The article of manufacture of claim 16, wherein moving the head page and the tail page occurs when the ring buffer is in overwrite mode and a writer of the ring buffer catches up to the head page by moving the tail page forward with one or more writes to the ring buffer, and wherein moving the head page and the tail page further includes the writer:
   performing a cmpxchg operation to change the state flag of a pointer to the head page from the header state to the update state so that a reader of the ring buffer is not able to swap the head page from the ring buffer;
   changing the state flag of a next page pointer from the head page to the header state in order to make the next page following the head page a new head page;
   setting the state flag of the pointer to the previous head page from the update state to the normal state; and
   moving the tail page forward to the previous head page.

19. The article of manufacture of claim 16, wherein a writer to the ring buffer preempts any other writers that are writing to the ring buffer via an interrupt, wherein the preempting writer must finish its write before any of the preempted writers can continue, and wherein only the writer that converted the state flag of a pointer from the header state to the update state can convert that pointer from the update state to the normal state.

20. The article of manufacture of claim 16, wherein the ring buffer includes a pointer to a commit page that is a page in the ring buffer with a last finished non-nested write, and wherein a reader may swap a page out of the ring buffer that is at least one of the commit page and the tail page, but cannot swap the reader page into the ring buffer if it is the commit page.

* * * * *